(12) United States Patent
Zhu

(10) Patent No.: US 11,976,209 B2
(45) Date of Patent: May 7, 2024

(54) ORGANOTIN COPOLYMERS AS POLYMERIC CROSSLINKING CATALYSTS

(71) Applicant: BASF Coatings GmbH, Münster (DE)

(72) Inventor: Zhongliang Zhu, Southfield, MI (US)

(73) Assignee: BASF COATINGS GMBH, Muenster (DE)

( * ) Notice: Subject to any disclaimer, the term of this patent is extended or adjusted under 35 U.S.C. 154(b) by 533 days.

(21) Appl. No.: 17/295,932

(22) PCT Filed: Nov. 22, 2019

(86) PCT No.: PCT/EP2019/082239
§ 371 (c)(1),
(2) Date: May 21, 2021

(87) PCT Pub. No.: WO2020/104661
PCT Pub. Date: May 28, 2020

(65) Prior Publication Data
US 2022/0010164 A1 Jan. 13, 2022

(30) Foreign Application Priority Data
Nov. 22, 2018 (EP) .................................... 18207796

(51) Int. Cl.
| | |
|---|---|
| *C09D 133/14* | (2006.01) |
| *C08F 8/10* | (2006.01) |
| *C08F 8/14* | (2006.01) |
| *C08F 220/20* | (2006.01) |
| *C08F 220/28* | (2006.01) |
| *C08F 220/32* | (2006.01) |
| *C08F 230/04* | (2006.01) |

(52) U.S. Cl.
CPC .............. *C09D 133/14* (2013.01); *C08F 8/10* (2013.01); *C08F 8/14* (2013.01); *C08F 220/20* (2013.01); *C08F 220/283* (2020.02); *C08F 220/325* (2020.02); *C08F 230/04* (2013.01); *C08F 2800/20* (2013.01)

(58) Field of Classification Search
CPC ...... C08F 220/283; C08F 230/04; C08F 8/10; C08F 8/14
See application file for complete search history.

(56) References Cited

FOREIGN PATENT DOCUMENTS

| | | | |
|---|---|---|---|
| JP | 05-295031 | * | 11/1993 |
| JP | 2003-261816 A | * | 9/2003 |
| JP | 2004-061682 | * | 2/2004 |
| WO | WO 2016/176394 A1 | * | 11/2016 |

OTHER PUBLICATIONS

Machine translation of JP 2003-261816 (no date).*
Machine translation of JP 05-295031 (no date).*
Machine translation of JP 2004-061682 (no date).*
International Search Report and Written Opinion for corresponding PCT/EP2019/082239 dated Jan. 30, 2020, 7 Pages.

* cited by examiner

*Primary Examiner* — Marc S Zimmer
(74) *Attorney, Agent, or Firm* — Armstrong Teasdale LLP

(57) ABSTRACT

Described herein is a (meth)acrylic copolymer including a polymeric backbone and at least two kinds of side chains (S1) and (S2) attached to the polymeric backbone, which are different from each other, namely one or more side chains (S1) including at least one tin-containing moiety and one or more side chains (S2) bearing at least one ester group of formula —O—C(=O)—$R^1$, where $R^1$ is a linear or branched, saturated or unsaturated, acyclic aliphatic residue having at least 18 carbon atoms, a method of preparing the copolymer, a method of using the copolymer as catalyst in crosslinking reactions in coating compositions and/or for lengthening the pot life of coating compositions and/or for lowering the curing temperatures of coating compositions, a coating composition including the copolymer and a method of coating a substrate including applying the coating composition to a substrate.

15 Claims, No Drawings

ORGANOTIN COPOLYMERS AS POLYMERIC CROSSLINKING CATALYSTS

CROSS-REFERENCE TO RELATED APPLICATIONS

This application is a U.S. National Phase Application of International Patent Application No. PCT/EP2019/082239, filed Nov. 22, 2019, which claims priority to European Patent Application No. 18207796.6, filed Nov. 22, 2018, the entire contents of which are hereby incorporated by reference herein.

The present invention relates to a (meth)acrylic copolymer comprising a polymeric backbone and at least two kinds of side chains (S1) and (S2) attached to said polymeric backbone, which are different from each other, namely one or more side chains (S1) comprising at least one tin-containing moiety and one or more side chains (S2) bearing at least one ester group of formula —O—C(=O)—R$^1$, wherein R$^1$ is a linear or branched, saturated or unsaturated, acyclic aliphatic residue having at least 18 carbon atoms, a method of preparing said copolymer, a use of said copolymer as catalyst in crosslinking reactions in coating compositions and/or for lengthening the pot life of coating compositions and/or for lowering the curing temperatures of coating compositions, a coating composition comprising said copolymer and to a method of coating a substrate comprising a step of applying said coating composition to a substrate.

BACKGROUND OF THE INVENTION

In today's effort to make vehicles lighter to reduce emissions and fuel consumption, automotive original equipment manufacturer (OEMs) are increasing the use of lower weight materials, including aluminum, magnesium and polymeric substrates. In the case of polymeric substrates lower curing temperatures are required, because such substrates usually deform at standard bake temperatures applied for metallic substrates. The use of catalysts was emerged as a viable approach to offer a cure at lower temperatures as it allows the desired crosslink reaction of coating compositions to proceed at such lower temperatures.

However, there can be drawbacks with respect to the use of catalysts. Standard tin catalysts such as dibutyltin dilaurate, which are used extensively in 2K automotive coatings as catalysts in particular for isocyanate/hydroxyl crosslinking reactions, can only provide acceptable fast cure rates and sufficient final product properties in a level where a short application time window is resulted. It appeared to be very challenging to balance the act between reactivity and stability in crosslinking reactions by simply manipulating the catalyst amounts due to the inherit drawbacks of the catalysts.

To circumvent the drawbacks of catalysts of the prior art such as conventional tin catalysts like organotin compounds and/or tin salts, catalyst encapsulation has become a very promising solution because a successful catalyst encapsulation can deliver catalysts in a controlled manner to avoid the early degradation of the coating compositions containing them. Most of such systems use polymer carriers to physically absorb-desorb the catalysts used. Depending on the characteristics of carriers, some systems can even control the catalyst release when shear force is applied to the carriers. Encapsulation systems of the prior art are, e.g. disclosed in US 2015/132592A1 A1, US 2015/133595A1 A1 and US 2016/090455 A1: US 2015/132592A1 A1 relates to coating compositions containing a film-forming resin as well as a catalyst such as a tin catalyst, e.g., dibutyltin dilaurate, which is contained within or encapsulated with a carrier, and aims at providing a control of cure speed and improvement of pot life for coating systems at ambient temperatures. Said catalyst may be released upon application of shear force. US 2015/133595A1 A1 discloses a catalyst such as an organotin compound, e.g., dibutyltin dilaurate, which is encapsulated into a polymer prepared from ethylenically unsaturated monomers, and can be used in aqueous coating systems. Said reference aims at accelerating the cure speed and lengthening of the pot life for coating systems. Finally, US 2016/090455 A1 relates to a composition comprising a thermosetting resin as well as polymer nanoparticles, which may inter alia release a catalyst during a curing process. Said reference aims at allowing low cure temperatures, short cure times, but at the same time long out-times.

However, disadvantages of these encapsulated systems as disclosed in US 2015/132592A1 A1, US 2015/133595A1 A1 and US 2016/090455 A1, which rely on physical absorbing-desorbing processes, often result in the fact that not always a desired uniform distribution of the catalysts throughout the whole system can be observed. Further, the pot life and/or the cure speed are not always satisfactory and/or the lowering of the curing temperature cannot always be achieved to a sufficient extent.

Problem

It has been therefore an object underlying the present invention to provide catalysts useful for crosslinking reactions in coating compositions, in particular for hydroxyl/isocyanate crosslinking reactions, which do not exhibit the aforementioned disadvantages of the catalytic systems of the prior art. In particular, it has been an object underlying the present invention to provide such catalysts that not only allow a control of their catalytic activity, when used in coating compositions, but also provide an improved pot life of these compositions and allow a uniform distribution of the catalyst therein.

Solution

This object has been solved by the subject-matter of the claims of the present application as well as by the preferred embodiments thereof disclosed in this specification, i.e. by the subject matter described herein.

A first subject-matter of the present invention is thus a (meth)acrylic copolymer, said (meth)acrylic copolymer comprising a polymeric backbone and at least two kinds of side chains (S1) and (S2) attached to said polymeric backbone, which are different from each other, namely one or more side chains (S1) comprising at least one tin-containing moiety, i.e. an organotin moiety, and one or more side chains (S2) bearing at least one ester group of formula —O—C(=O)—R$^1$, wherein R$^1$ is a linear or branched, saturated or unsaturated, acyclic aliphatic residue having at least 18 carbon atoms.

A further subject-matter of the present invention is a method of preparing the inventive (meth)acrylic copolymer comprising at least one step, wherein (s1) at least one (meth)acrylic monomer comprising at least one tin-containing moiety, (s2) at least one (meth)acrylic monomer bearing at least one ester group of formula —O—C(=O)—R$^1$, wherein R$^1$ is a linear or branched, saturated or unsaturated, acyclic aliphatic residue having at least 18 carbon atoms, and optionally (s3) at least one ethylenically unsaturated monomer, which is different from both monomers (s1) and (s2), are copolymerized to form the copolymer, or wherein (s1) at least one (meth)acrylic monomer comprising at least one tin-containing moiety, (s2) at least one (meth)acrylic monomer bearing at least one functional group, which is suitable of being transformed into at least one ester group of formula —O—C(=O)—R$^1$, wherein R$^1$ is a linear or branched, saturated or unsaturated, acyclic aliphatic residue having at least 18 carbon atoms, and optionally (s3) at least one ethylenically unsaturated monomer, which is different from both monomers (s1) and (s2), are copolymerized to form the copolymer, followed by transforming the at least one functional group of the structural unit obtained from the at least one monomer (s2) into at least one ester group of formula —O—C(=O)—R$^1$, wherein R$^1$ is a linear or branched, saturated or unsaturated, acyclic aliphatic residue having at least 18 carbon atoms, in a polymer analogous reaction.

A further subject-matter of the present invention is a use of the inventive (meth)acrylic copolymer as catalyst, in particular as an encapsulated catalyst, in crosslinking reactions in coating compositions and/or for lengthening the pot life of coating compositions and/or for lowering the curing temperatures of coating compositions.

A further subject-matter of the present invention is a coating composition comprising at least one polymer as binder component (a) and at least one inventive (meth) acrylic as component (b), wherein the polymer of the binder component (a) is different from the (meth)acrylic copolymer of component (b).

A further subject-matter is a method of coating a substrate comprising at least one step (1), namely (1) applying an inventive coating composition containing the inventive copolymer to a substrate.

It has been surprisingly found that by providing the inventive copolymer a new catalyst encapsulation system can be established, which makes use of a chemical reaction in order to incorporate tin catalytic moieties into a copolymer, which is very special compared to the merely physically absorb-desorb based catalyst encapsulation systems of the prior art.

Moreover, it has been surprisingly found that the side chains (S2) on the inventive copolymer help the copolymer stay immiscible in hydrocarbon solvents within a certain temperature range, such as from room temperature (18° C.) to an upper critical solubility temperature (UCST). In other words, due to the presence of these side chains (S2) the organotin moieties present within side chains (S1) of the inventive copolymer are surprisingly present in an encapsulated state. A controlled catalyst release form this encapsulated state can be achieved as soon as said UCST has been reached as the inventive copolymer will become completely miscible and its tin-containing moiety for use as catalytic moiety can freely interact with the target functional moieties in the coating composition which are ought to be crosslinked. The advantage of this system is in particular that it offers the provision of coating compositions having not only a long pot life, but also allows a control of the performance of the catalyst, i.e. the tin-containing moiety of the inventive copolymer at a chosen application temperature, however, without negatively affecting the catalyst performance at the application temperatures. As a result, a stable low bake coating system can be reached. In particular, it has been surprisingly found that this unexpected effect takes place, when the inventive copolymer is incorporated into a coating composition such as an organic solvent(s) based coating composition: a good dispersion of the copolymer in solvents like solvent naphtha and/or toluene mixtures at room temperature (18° C.) ensures a uniform distribution of the copolymer throughout the whole solution as well as a good encapsulation by maintaining the phase separation. When heated, in particular to 55-60° C., the copolymer dispersion becomes a completely miscible solution, and the catalyst is released in such a way that the respective catalytic moiety of the inventive copolymer can freely interact with the target functionalities in the coating composition. The release temperature range of in particular 55-60° C. is ideal, because is sufficiently high enough to overcome the typical coating composition storage temperature, but sufficiently low enough to release the catalyst before the baking temperature is reached.

It has been therefore further surprisingly found that in contrast to a physical absorb-desorb processes of encapsulated catalyst systems of the prior art, the inventive copolymer allows a much more uniform distribution of the tin-containing catalytic moiety throughout the whole system in a such way that the catalytic activity of tin within these moieties is expected to be more predictable and in that a more uniform catalyst delivery is enabled.

The production of the inventive copolymer for use as catalyst can also benefit from its chemical modification being a result of the one or more side chains present because the reproduction of said preparation method may be much easier.

Finally, it has also been surprisingly found that a toxicity decreasing trend is observed within copolymers bearing tin-containing structural units derived from monomers that have been obtained from dibutyltin oxide to structural units derived from monomers that have been obtained from dioctyltin oxide. Thus, the toxicity can be controlled and in particular lowered by making use of longer alkyl chains within the tin-containing structural units of the inventive copolymer. By this, a "greener" catalyst system can be provided that in turn allows a more sustainable chemistry.

DETAILED DESCRIPTION OF THE INVENTION

Copolymer

The inventive (meth)acrylic copolymer comprises a polymeric backbone and at least two kinds of side chains (S1) and (S2) attached to said polymeric backbone, which are different from each other, namely one or more side chains (S1) comprising at least one tin-containing moiety and one or more side chains (S2) bearing at least one ester group of formula —O—C(=O)—R$^1$, wherein R$^1$ is a linear or branched, saturated or unsaturated, acyclic aliphatic residue having at least 18 carbon atoms.

Herein the (meth)acrylic copolymer according to the present invention is also called a "copolymer according to the (present) invention" or an "inventive copolymer" or "inventive (meth)acrylic copolymer".

The term "(meth)acrylic" means "acrylic" and/or "methacrylic". Similarly, "(meth)acrylate" means acrylate and/or methacrylate. Therefore, a "(meth)acrylic copolymer" in general may be formed from only "acrylic monomers", only "methacrylic monomers" or from both "acrylic and methacrylic monomers". However, ethylenically unsaturated monomers other than acrylic and/or methacrylic monomers as e.g. styrene and the like may also be additionally contained in a "(meth)acrylic copolymer". In other words, a (meth)acrylic copolymer may consist of only acrylic and/or methacrylic monomer units but does not have to. Preferably, the backbone of the (meth)acrylic copolymer is formed from more than 50 mole-%, even more preferably of from more than 75 mole-%, in particular of from 100 mole-% of (meth)acrylic monomers.

The inventive (meth)acrylic copolymer contains at least two kinds of structural units (SU1) and (SU2), which are different from each other. Structural unit (SU1) contains at least one side chain (S1) and is prepared by making use of at least one monomer (s1), which is suitable for introducing the at least one side chain (S1) into the copolymer and for forming the structural unit (SU1) within the copolymer. Structural unit (SU2) contains at least one side chain (S2) and is prepared by making use of at least one monomer (s2), which is suitable for introducing the at least one side chain (S2) into the copolymer during polymerization or afterwards in a polymer analogous reaction and for forming the structural unit (SU2) within the copolymer. The inventive copolymer may further comprise at least one additional structural unit (SU3), which contains at least one side chain (S3) and is prepared by making use of at least one monomer (s3), which is suitable for introducing the at least one side chain (S3) into the copolymer and for forming the structural unit (SU3) within the copolymer.

Preferably, the amount of structural units (SU1) in the inventive copolymer in mole-% is greater than the amount of structural units (SU2) in the inventive copolymer in mole-%.

Preferably, the relative molar ratio of the at least one structural unit (SU1) to the at least one structural unit (SU2) in the (meth)acrylic copolymer is in the range of from 20:1 to 1:5, more preferably in the range of from 15:1 to 1:2.5, even more preferably in the range of from 12:1 to 1:1, still more preferably in the range of from 10:1 to 1:1, in particular of from 2:1 to 1:1.

Preferably, the amount of structural units (SU1) in the (meth)acrylic copolymer is at least 15 mole-% more preferably at least 20 mole-%, even more preferably at least 25 mole-% or at least 30 mole-%, still more preferably at least 35 mole-%, in particular at least 40 mole-%, in each case based on the total amount of all structural units of the copolymer.

Preferably, the amount of structural units (SU2) in the (meth)acrylic copolymer is at least 5 mole-% more preferably at least 10 mole-%, even more preferably at least 15 mole-%, in particular at least 20 mole-%, in each case based on the total amount of all structural units of the copolymer.

Preferably, the amount of optional structural units (SU3) in the (meth)acrylic copolymer is at least 5 mole-% more preferably at least 10 mole-%, even more preferably at least 20 mole-% in particular at least 40 mole-%, in each case based on the total amount of all structural units of the copolymer.

Preferably, the copolymer according to the invention, based on the total quantity of the at least two structural units (SU1) and (SU2) and the optionally present at least one further structural (SU3), contains the following proportions in mole-%:
  10 to 70 mole-%, preferably 20 to 60 mole-%, more preferably 30 to 50 mole-%, of the structural units (SU1),
  10 to 40 mole-%, preferably, 10 to 35 mole-%, more preferably 10 to 30 mole-%, of the structural units (SU2) and
  0 to 60 mole-%, preferably 5 or 10 or 15 to 60 mole-%, more preferably 30 to 50 mole-%, of the structural units (SU3).

Here it is in each case clear to those skilled in the art that the total content of the at least two structural units (SU1) and (SU2) and the optionally present at least one further structural (SU3) within the inventive copolymer overall makes up 100 mole-%.

Preferably, the inventive (meth)acrylic copolymer has a weight average molecular weight ($M_w$) in the range of from 1,000 to 200,000 g/mol, more preferably of from 1,000 to 100,000 g/mol, even more preferably of from 1,500 to 50,000 g/mol, still more preferably of from 2,000 to 20,000 g/mol, yet more preferably of from 2,000 to 15,000 g/mol.

The weight average molecular weight of the inventively used copolymers is determined according to the method described hereinafter ("Test methods"), i.e. is determined via GPC using polystyrene standards and THF as eluent.

Preferably, the inventive copolymer is a non-ionic copolymer, e.g. does not contain any ionic groups such as ammonium salt groups. Preferably, the inventive (meth)acrylic copolymer does not contain any acid groups, in particular does not contain any carboxylic acid groups, neither in the free form nor in the form of a salt.

The polymerization reaction for preparing the inventive copolymer can be carried out by all methods known in literature, such as free radical polymerization, controlled/living radical polymerization, ionic polymerization, or group transfer polymerization. It is well-known that the average molecular weight and its distribution of an inventive copolymer can be controlled by using chain transfer agents or making use of controlled/living polymerization technologies. Branched or star shaped structures are available for example by using difunctional or higher functional co-monomers during the copolymerization and/or the use of multifunctional initiators and/or multifunctional chain transfer agents. Free radical polymerization is preferred. At least two ethylenically unsaturated monomers different from one another are preferably used, which each contain at least one, preferably precisely one, terminal ethylenically unsaturated group, namely at least one monomer (s1) and at least one monomer (s2).

Preferably, the inventive copolymer is a random copolymer or structured copolymer. Structured copolymers are e.g. block copolymers such as linear block copolymers, branched block copolymers, star-shaped block copolymers, gradient copolymers and comb copolymers. Thus, the inventively used copolymer may have a random, or gradient-like or block-like sequence of copolymerized structural units derived from suitable ethylenically unsaturated monomers.

In particular, the inventive copolymer has a random sequence of copolymerized structural units. The structure of the inventive copolymer is preferably linear or branched, in particular linear.

Side Chain(s) (S1)

The one or more side chains (S1) comprise at least one tin-containing moiety. Said tin-containing moiety is an organotin-containing moiety.

Tin containing polymers in general are known from the prior art: For example, a diblock copolymer made from methyl methacrylate and acetyl dibutyltin methacrylate as well as a study of the morphology of this copolymer is disclosed in Lei et al., J. Organomet. Chem. 2011, 696, 14116 to 1424. Tin containing copolymers obtained by polymerization of tributyl tin methacrylate and different lower alkyl methacrylates are known from Ghanem et al., European Polymer 1979, 15, 823-826. Further, copolymers made from styrene, butyl acrylate and one of dibutyl citraconate and dibutyl maleate are disclosed by Al-Deyab et al., Molecules 2010, 15, 1784-1797.

Preferably, the one or more side chains (S1) are represented by the part structure (PS1)

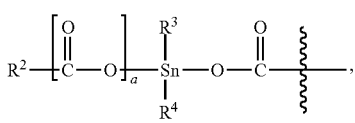

wherein the symbol —ξ— denotes a covalent bond of part structure (PS1) to the backbone of the copolymer, parameter a is 0 or 1 and $R^2$, $R^3$ and $R^4$ independently of one another represent a linear, saturated, alkyl group with 1 to 30 carbon atoms, a branched, saturated, alkyl group with 3 to 30 carbon atoms, an aryl group with 6 to 30 carbon atoms, or an alkylaryl group or arylalkyl group, in each case with 7 to 30 carbon atoms.

Preferably, parameter a is 1 and $R^2$, $R^3$ and $R^4$ independently of one another represent a linear, saturated, alkyl group with 1 to 20 carbon atoms or a branched, saturated, alkyl group with 3 to 20 carbon atoms.

More preferably, parameter a is 1, R represents a linear, saturated, alkyl group with 1 to 8, in particular 1 to 6 or 2 to 4 carbon atoms, and $R^3$ and $R^4$ independently of one another represent a linear, saturated, alkyl group with 1 to 8, in particular 1 to 6 or 2 to 4 carbon atoms. In particular, the number carbon atoms of $R^2$ is lower than the number of carbon atoms of $R^3$ and $R^4$.

Examples of suitable monomers (monomers (S1)) for building up the polymeric backbone of the inventive copolymer and for incorporation of the one or more side chains (S1) are lauryl dibutyltin (meth)acrylate, acetyl dibutyltin (meth)acrylate and acetyl dioctyltin (meth)acrylate. Acetyl dibutyltin (meth)acrylate and acetyl dioctyltin (meth)acrylate are especially preferred. In terms of toxicity, acetyl dioctyltin (meth)acrylate is in particular preferred.

Side Chain(s) (S2)

The one or more side chains (S2) contain at least one ester group of formula —O—C(=O)—$R^1$, wherein $R^1$ is a linear or branched, saturated or unsaturated, acyclic aliphatic residue having at least 18 carbon atoms. Preferably, the one or more side chains (S2) additionally contain at least one hydroxyl group.

Preferably, radial $R^1$ is a linear or branched, saturated or unsaturated, acyclic aliphatic residue having from 18 to 65 carbon atoms, more preferably 18 to 60, even more preferably 19 to 58, still more preferably 20 to 56, in particular 25 to 55 carbon atoms.

The residue $R^1$ preferably is the aliphatic residue of a fatty acid such as a primary carboxylic fatty acid. The term "fatty acid" particularly refers to an aliphatic $C_{19}$-$C_{65}$ monocarboxylic acid having a total of 19 to 65 carbon atoms, preferably to an aliphatic $C_{19}$-$C_{60}$ monocarboxylic acid having a total of 19 to 60 carbon atoms, more preferably to an aliphatic $C_{20}$-$C_{58}$ monocarboxylic acid having a total of 20 to 58 carbon atoms, in particular to an aliphatic $C_2$-$C_{56}$ monocarboxylic acid having a total of 22 to 56 carbon atoms, each having in each case precisely one —C(=O)—OH group. The expression "aliphatic" here embraces acyclic saturated or unsaturated, preferably unsaturated, branched or unbranched (linear) aliphatic radicals. Unsaturated aliphatic radicals here have at least one, preferably 1, 3, 4, or 5, more preferably 1, 2, 3, or 4, very preferably 1, 2, or 3 carbon double bond(s). The fatty acids may be natural or synthetically produced fatty acids. Exemplary fatty acids are selected from the group consisting of nonadecanoic acid, arachidic acid, henicosanoic acid, docosanoic acid, gadoleic acid, icosenoic acid, cetoleic acid, erucasic acid, arachidonic acid, timnodonic acid, clupanodonic acid, cervonic acid, hexadecatrienoic acid, rumelenic acid, α-parinaric acid, β-parinaric acid, eicosatrienoic acid, eicosatetraenoic acid, eicosapentaenoic acid, heneicosapentaenoic acid, docosapentaenoic acid, docosahexaenoic acid, tetracosapentaenoic acid, tetracosahexaenoic acid (nisinic acid), eicosadienoic acid, podocarpic acid, bosseopentaenoic acid, docosadienoic acid, docosatetraenoic acid, docosapentaenoic acid, tetracosatetraenoic acid, tetracosapentaenoic acid, rumenic acid, paullinic acid, 15-docosenoic acid, 17-etracosenoic acid, gondoic acid, mead acid, erucic acid and nervonic acid.

Preferably, the one or more side chains (S2) are represented by the part structure (PS2)

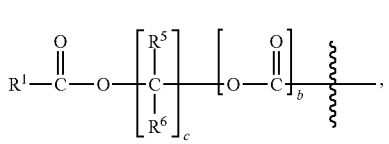

wherein the symbol —ξ— denotes a covalent bond of part structure (PS2) to the backbone of the copolymer, parameter b is 0 or 1, parameter c is in the range of from 2 to 20, $R^1$ has the meaning as defined hereinbefore, each $R^5$ independently represents hydrogen, hydroxyl, a linear, saturated, alkyl group with 1 to 30 carbon atoms or a branched, saturated, alkyl group with 3 to 30 carbon atoms, and each $R^6$ independently represents hydrogen, a linear, saturated, alkyl group with 1 to carbon atoms or a branched, saturated, alkyl group with 3 to 30 carbon atoms.

Preferably, parameter b is 1, parameter c is the range of from 2 to 10, in particular of from 2 to 8 or 2 to 6, most preferred 3, each $R^5$ represents hydrogen or hydroxyl, more preferably one of radicals $R^5$ denotes hydroxyl and the remaining radicals denote hydrogen, and each $R^6$ represents hydrogen.

Examples suitable (monomers (s2)) f building up the polymeric backbone of the inventive incorporation of the one or more side chains (S2) are reaction products of epoxide-functional (meth)acrylates such as glycidyl (meth)acrylate and a primary carboxylic acid having linear or branched, saturated or unsaturated, acyclic aliphatic residue having at least 18 and in particular from 18 to 60 carbon atoms. Alternatively, glycidyl (meth)acrylate as such can be used as monomer (s2) and an esterification with a primary carboxylic acid having a linear or branched, saturated or unsaturated, acyclic aliphatic residue having at least 18 or from 18 to 60 carbon atoms can be performed after formation of the copolymer in a polymer analogous reaction, for example by using a suitable base as catalyst such as dimethyl ethanolamine.

Alternatively, instead of epoxide-functional (meth)acrylates such as glycidyl (meth)acrylate, simply OH-functional monomers can be used. The OH-group of such monomers can then later be subjected to an esterification with a primary carboxylic acid having a linear or branched, saturated or unsaturated, acyclic aliphatic residue having at least 8 or from 8 to 40 carbon atoms. Examples of such monomers (s2) are 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, 3-phenoxy-2-hydroxypropyl (meth)acrylate, glycerol mono (meth)acrylate, N-(2-hydroxypropyl) (meth)acrylamide, allyl alcohol, hydroxystyrene, hydroxyalkyl vinyl ethers such as hydroxybutyl vinyl ether and vinylbenzyl alcohol.

An inventively used primary carboxylic acid, which has a linear or branched, saturated or unsaturated, acyclic aliphatic residue having at least 8 or from 8 to 40 carbon atoms is, e.g., the commercial product Unicid® 350.

Optional Further Side Chain(s) (S3)

Preferably, the inventive copolymer has at least one further kind of side chains (S3) attached to its polymeric backbone, which are different from both side chains (S1) and (S2), namely one or more side chains (S3) being represented by the part structure (PS3)

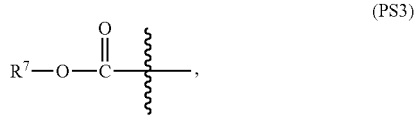

(PS3)

wherein $R^7$ denotes a linear, saturated, alkyl group with 1 to 30 carbon atoms, a branched, saturated, alkyl group with 3 to 30 carbon atoms, an aryl group with 6 to carbon atoms, or an alkylaryl group or arylalkyl group, in each case with 7 to 30 carbon atoms.

Examples of suitable monomers (monomers (s3)) for building up the polymeric backbone of the inventive copolymer and for incorporation of the one or more side chains (S3) are (meth)acrylic esters of an aliphatic $C_1$-$C_{30}$-monoalcohol such as methyl (meth)acrylate, ethyl (meth)acrylate, n-propyl (meth)acrylate), i-propyl (meth)acrylate, n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate and isobornyl methacrylate. An example of a monomer (s3), which is a (meth) acrylic ester of an aromatic $C_6$-$C_{30}$-monoalcohol is phenyl (meth)acrylate. Examples of monomers (s3), which are (meth)acrylic esters of an araliphatic $C_7$-$C_{30}$-monoalcohol are benzyl acrylate and benzyl methacrylate. Particularly preferred are (meth)acrylic esters of an aliphatic $C_8$-$C_{25}$-monoalcohol, most preferred of an aliphatic $C_8$-$C_{18}$-monoalcohol. Preferred monomers are n-butyl acrylate, n-butyl methacrylate, lauryl acrylate, lauryl methacrylate, 2-ethylhexyl acrylate and 2-ethylhexyl methacrylate. Most preferred are lauryl acrylate, lauryl methacrylate, 2-ethylhexyl acrylate and 2-ethylhexyl methacrylate.

It is also possible to use other ethylenically unsaturated monomer as monomers (s3) for building up the polymeric backbone of the inventive copolymer and for incorporation of the one or more side chains (S3), namely such monomers, which bear at least one amino group such as N,N-dimethylaminoethyl acrylate, N,N-dimethylaminoethyl methacrylate, N,N-dimethylaminopropyl acrylate, N,N-dimethylaminopropyl methacrylate, 2-(N,N-diethylamino)ethyl (meth) acrylate, 2-(N,N-dimethylamino)ethyl (meth)acrylate, N-[3-(N,N-dimethylamino)propyl](meth)acrylamide, 3-dimethylaminoneopentyl (meth)acrylate, 2-N-morpholinoethyl (meth)acrylate, N-[3-(N,N-dimethylamino)propyl] (meth)acrylamide, 2-(N,N-diethylamino)ethyl (meth)acrylamide, 2-(tert-butylamino)ethyl (meth)acrylate, 2-diisopropylaminoethyl (meth)acrylate, N-dodecylacrylamide and N-[2-(N, N-Dimethylamino)ethyl] (meth)acrylamide, 2-vinylpyridine, 4-vinylpyridine, allyl amine, and vinylimidazole as well as N,N-diethylaminostyrene (all isomers) and N,N-diethylamino-alpha-methylstyrene (all isomers). Among these examples, the (meth)acrylate and (meth)acrylamide based monomers are preferred. (Meth)acrylate monomers are very preferred. Particularly preferred aminogroup containing monomers are N,N-dimethylaminoethyl acrylate, N,N-dimethylaminoethyl methacrylate, N,N-dimethylaminopropyl acrylate and N,N-dimethylaminopropyl methacrylate or mixtures thereof.

It is also possible to use other ethylenically unsaturated monomer as monomers (s3) such as styrene, alpha-alkylstyrenes, especially alpha-methylstyrene, and/or vinyltoluene; vinylbenzoic acid (all isomers), alpha-methylvinylbenzoic acid (all isomers), and/or p-vinylbenzenesulfonic acid, maleic and/or fumaric acid and/or itaconic acid and their esters, amides, and imides, and (meth)acrylic acid, nitriles such as acrylonitrile and/or methacrylonitrile and methoxypolyethylene glycol monoacrylate and methoxypolyethylene glycol monomethacrylate as well as methoxypolypropylene glycol monoacrylate and methoxypolypropylene glycol monomethacrylate, divinylbenzene, di(meth)acrylate monomers, tri(meth)acrylate monomers and tetra(meth) acrylate monomers.

Preparation of the Copolymer

Preferably, the inventive copolymer is obtainable by copolymerization of at least one of monomers (s1) and (s2) and further optionally of at least monomer (s3), namely (s1) at least one (meth)acrylic monomer comprising at least one tin-containing moiety, (s2) at least one (meth)acrylic monomer bearing at least one ester group of formula —O—C(=O)—$R^1$, wherein $R^1$ is a linear or branched, saturated or unsaturated, acyclic aliphatic residue having at least 18 carbon atoms, and optionally (s3) at least one ethylenically unsaturated monomer, which is different from both monomers (s1) and (s2), or by copolymerization of (s1) at least one (meth)acrylic monomer comprising at least one tin-containing moiety, (s2) at least one (meth)acrylic monomer bearing at least one functional group, which is suitable of being transformed into at least one ester group of formula —O—C(=O)—$R^1$, wherein $R^1$ is a linear or branched, saturated or unsaturated, acyclic aliphatic residue having at least 18 carbon atoms, and optionally (s3) at least one ethylenically unsaturated monomer, which is different from both monomers (s1) and (s2), followed by transforming the at least one functional group of the structural unit obtained from the at least one monomer (82) into at least one ester group of formula —O—C (=O)—$R^1$, wherein $R^1$ is a linear or branched, saturated or unsaturated, acyclic aliphatic residue having at least 18 carbon atoms, in a polymer analogous reaction.

Each monomer (s1) used contains at least one tin-containing moiety, which is part of each side chain (S1) after formation of the inventive copolymer. Structural unit (SU1) results from using monomers (ci). Each monomer (s2) either contains at least one ester group of formula —O—C(=O)—$R^1$, wherein $R^1$ is a linear or branched, saturated or unsaturated, acyclic aliphatic residue having at least 18 carbon atoms, which is part of each side chain (S2) after formation of the inventive copolymer, or contains at least one precursor functional group such an epoxide group, which can be transformed into said at least one ester group of formula —O—C(=O)—R$^1$, after formation of the copolymer in a polymer analogous reaction. Structural unit (SU2) results from using monomers (s2).

In particular, the inventive copolymer is obtainable by copolymerization of at least one of monomers (s1) and (s2) and further of at least monomer (s3), namely of
(s1) 10 to 70 mole-%, preferably 20 to 60 mole-%, more preferably 30 to 50 mole-%, of at least one (meth)acrylic monomer comprising at least one tin-containing moiety,
(s2) 10 to 40 mole-%, preferably, 10 to 35 mole-%, more preferably 10 to 30 mole-%, of at least one (meth)acrylic monomer bearing at least one ester group of formula —O—C(=O)—R$^1$, wherein R$^1$ is a linear or branched, saturated or unsaturated, acyclic aliphatic residue having at least 18 carbon atoms, and
(s3) 0 to 60 mole-%, preferably 5 or 10 or 15 to 60 mole-%, more preferably 30 to 50 mole-%, of at least one ethylenically unsaturated monomer, which is different from both monomers (s1) and (s2),
or by copolymerization of
(s1) 10 to 70 mole-%, preferably 20 to 60 mole-%, more preferably 30 to 50 mole-%, of at least one (meth)acrylic monomer comprising at least one tin-containing moiety,
(s2) 10 to 40 mole-%, preferably, 10 to 35 mole-%, more preferably 10 to 30 mole-%, of at least one (meth)acrylic monomer bearing at least one functional group, which is suitable of being transformed into at least one ester group of formula —O—C(=O)—R$^1$, wherein R$^1$ is a linear or branched, saturated or unsaturated, acyclic aliphatic residue having at least 18 carbon atoms, and
(s3) 0 to 60 mole-%, preferably 5 or 10 or 15 to 60 mole-%, more preferably 30 to 50 mole-%, of at least one ethylenically unsaturated monomer, which is different from both monomers (s1) and (s2),
followed by transforming the at least one functional group of the structural unit obtained from the at least one monomer (s2) into at least one ester group of formula —O—C(=O)—R$^1$, wherein R$^1$ is a linear or branched, saturated or unsaturated, acyclic aliphatic residue having at least 18 carbon atoms, in a polymer analogous reaction,
wherein the sum of all monomers used for the preparation of the inventive copolymer adds up to 100 mole-%.

Method of Preparing the Copolymer

A further subject-matter of the present invention is a method of preparing the inventive (meth)acrylic copolymer comprising at least one step, wherein
(s1) at least one (meth)acrylic monomer comprising at least one tin-containing moiety,
(s2) at least one (meth)acrylic monomer bearing at least one ester group of formula —O—C(=O)—R$^1$, wherein R$^1$ is a linear or branched, saturated or unsaturated, acyclic aliphatic residue having at least 18 carbon atoms, and optionally
(s3) at least one ethylenically unsaturated monomer, which is different from both monomers (s1) and (s2),
are copolymerized to form the copolymer, or wherein
(s1) at least one (meth)acrylic monomer comprising at least one tin-containing moiety,
(s2) at least one (meth)acrylic monomer bearing at least one functional group, which is suitable of being transformed into at least one ester group of formula —O—C(=O)—R, wherein R$^1$ is a linear or branched, saturated or unsaturated, acyclic aliphatic residue having at least 18 carbon atoms, and optionally
(s3) at least one ethylenically unsaturated monomer, which is different from both monomers (s1) and (s2),
are copolymerized to form the copolymer, followed by transforming the at least one functional group of the structural unit obtained from the at least one monomer (s2) into at least one ester group of formula —O—C(=O)—R$^1$, wherein R$^1$ is a linear or branched, saturated or unsaturated, acyclic aliphatic residue having at least 18 carbon atoms, in a polymer analogous reaction.

All preferred embodiments described above herein in connection with the inventive copolymer and its preferred embodiments are also preferred embodiments of the inventive method of preparing said copolymer.

Use of the Copolymer

A further subject-matter of the present invention is a use of the inventive (meth)acrylic copolymer as catalyst, in particular as an encapsulated catalyst, in crosslinking reactions in coating compositions and/or for lengthening the pot life of coating compositions and/or for lowering the curing temperatures of coating compositions.

All preferred embodiments described above herein in connection with the inventive copolymer, the inventive method of preparing said copolymer and the preferred embodiments thereof are also preferred embodiments of the inventive use.

Coating Composition

A further subject-matter of the present invention is a coating composition comprising at least one polymer as binder component (a) and at least one inventive (meth) acrylic as component (b), wherein the polymer of the binder component (a) is different from the (meth)acrylic copolymer of component (b).

All preferred embodiments described above herein in connection with the inventive copolymer, the inventive method of preparing said copolymer, the inventive use and the preferred embodiments thereof are also preferred embodiments of the inventive coating composition.

Preferably, the inventive coating composition contains the at least one (meth)acrylic copolymer as component (b) in an amount of from 0.05 to 10 wt.-%, more preferably of from 0.1 to 7.5 or 5 wt-%, even more preferably of from 0.2 to 4.5 wt-%, still more preferably of from 0.3 to 4 or 3 or 2 wt-%, in particular of from 0.4 to 15 wt.-%, based on the total weight of the coating composition.

The coating composition can be aqueous or essentially non-aqueous, i.e. based on organic solvents. Preferably, it is based on at least one organic solvent and more preferably essentially non-aqueous. This means, that the amount of solvent present in the composition is predominantly due to the presence of at least one organic solvent. Preferably, water is not added to the composition on purpose. It may, however, not been ruled out that the composition is free of water since one or more of the components used for preparing the composition may contain (residues of) water.

The amount of an at least one organic solvent present in the coating composition preferably is in the range of from 5 to 50 wt.-%, more preferably is in the range of from 10 to 40 wt.-%, based on the total weight of the composition.

The at least one polymer of the binder component (a) preferably has at least one crosslinkable functional group. Here, any usual crosslinkable functional group known to those skilled in the art is possible. In particular, the crosslinkable functional groups are selected from the group consisting of hydroxyl groups, amino groups, carboxylic acid groups, and epoxides. Particularly preferable are hydroxyl groups. Preferably, said at least one polymer is selected from the group consisting of polyurethanes, polyesters, polyamides, polyureas, poly(meth)acrylates and mixtures thereof as well as hybrid polymers thereof such as, e.g., polyurethane (meth)acrylates. The polymers such as poly (meth)acrylates can be homo- or copolymers. Particularly preferred are OH-functional poly(meth)acrylates such as OH-functional (meth)acrylic copolymers and/or OH-functional polyesters, The binder component (a) may comprise a second polymer such as a melamin resin, melamine-formaldehyde resins, free and/or blocked polyisocyanates. Preferably, the binder component (a) comprises at least one polyisocyanate as second polymer, which is preferably blocked. In particular such a preferably blocked polyisocyanate is used in combination with at least one OH-functional polymer such as a OH-functional (meth)acrylic copolymer.

The amount of the at least one polymer of the binder component (a) present in the coating composition preferably is in the range of from 10 to 70 wt.-%, more preferably is in the range of from 15 to 60 wt.-%, .-%, even more preferably is in the range of from 20 to 55 wt.-%, based on the total weight of the composition.

Method of Coating

A further subject-matter is a method of coating a substrate comprising at least one step (1), namely (1) applying an inventive coating composition containing the inventive copolymer to a substrate.

All preferred embodiments described above herein in connection with the inventive copolymer, the inventive method of preparing said copolymer, the inventive use, the inventive coating composition and the preferred embodiments thereof are also preferred embodiments of the inventive method of coating.

Preferably, the coating composition is a primer or clearcoat composition, in particular a clearcoat composition. Thus, the substrate used preferably bears at least one coating layer and the inventive coating composition is applied onto said layer. The substrate may be metallic or made at least partially of plastic.

Methods

1. Solid Matter

The amount of solid matter is determined via DIN EN ISO 3251:2008-06 at 110° C. for 60 mi.

2. Number and Weight Average Molecular Weight

The number average ($M_n$) and weight average ($M_w$) molecular weights and the molecular weight distribution of the inventive copolymer or any precursors thereof are determined by GPC-analysis (gel permeation chromatography analysis) according to DIN 55672-1:2007-08 at 40° C. using a high-pressure liquid chromatography pump. The eluent used for the copolymers was tetrahydrofuran with an elution rate of 1 ml/min. The conventional calibration was carried out using Polystyrene standards.

3. Viscosity Measurements

Viscosity of the application examples (cf. items 4. and 5. of the experimental part) is determined on Brookfield 1/23 CAP2000+L viscometer at 24° C. or 40° C. Kegel CAP-06 is used. Viscosity of examples 2A to 2C (cf. item 2. of the experimental part) is determined on Brookfield CAP2000+H viscometer at 60° C. Kegel CAP-03 is used.

4. Cure Onset Temperature

Cure onset temperatures are determined by using a Rheometrics DMTA Mark V dynamic mechanical thermal analyzer (DMTA) with the configuration described in Table 1.

TABLE 1

| DMTA Method | | | |
|---|---|---|---|
| Frequency | 1 Hz | Ramp Rate: | 2° K/Min |
| Initial Temp: | 25.0° C. | Time per Measure: | 10 sec |
| Final Temp: | 200° C. | Strain: | 0.20% |

Each sample was deposited (several drops) to a single layer fiberglass braid previously mounted in the DMTA (tensile geometry).

The samples were measured with the following time/temperature sweep program:
1. Sample is initially cooled to 25° C. (77° F.).
2. Sample is heated to 200° C. (392° F.) at a ramp rate of 2° K (5.4° F.) per minute.

EXAMPLES (EXPERIMENTAL PART)

The following examples further illustrate the invention but are not to be construed as limiting its scope. In the following, all amounts given in the Tables are parts by weight if not indicated otherwise.

1. Synthesis of Organotin (meth)acrylate Monomers (Monomers (s1))

Example 1A: Acetyl Dibutyltin Methacrylate 111.65 g Dibutyltin oxide and 200 mL toluene were added to a 500 mL round bottom flask equipped with a thermocouple, condenser, $N_2$ inlet and paddle blade stirrer. The obtained suspension was heated to 50° C. under an $N_2$ blanket, and 39.01 g methacrylic acid in 20 mL toluene was added over 30 min. The reaction mixture was continued to stir at 50° C. for 2 h until a homogeneous solution was obtained. The reaction mixture was then cooled to room temperature, followed with the addition of 29.63 g acetic acid in 20 mL toluene over 20 min. The reactor contents were allowed to stir for 2 h at room temperature, followed with a filtration. The solution was collected, and the volatile components were removed under reduced pressure. The residual liquid was dried at 50° C. under reduced pressure for 1 h leaving behind the product as colorless liquid.

The reaction scheme for preparing Example 1A is displayed below:

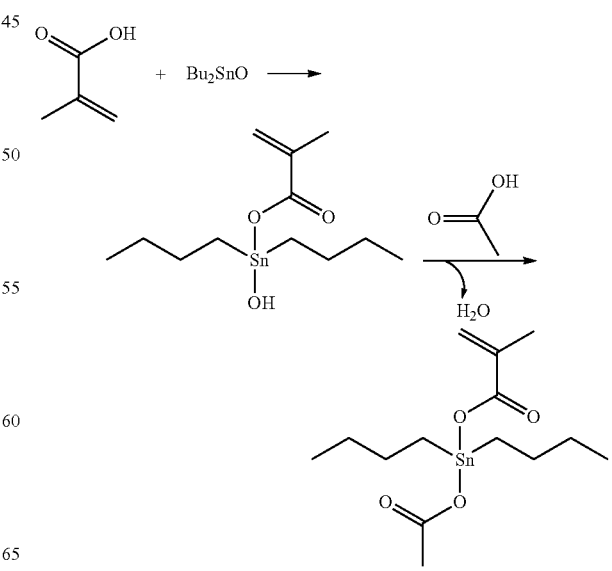

Example 1B: Lauryl Dibutyltin Methacrylate 90.11 g Dibutyltin oxide and 150 mL toluene were added to a 500 mL round bottom flask equipped with a thermocouple, condenser, $N_2$ inlet and paddle blade stirrer. The obtained suspension was heated to 50° C. under an $N_2$ blanket, and 31.50 g methacrylic acid in 20 mL toluene was added over 30 min. The reaction mixture was continued to stir at 50° C. for 2 h until a homogeneous solution was obtained. The reaction mixture was then cooled to room temperature, followed with the addition of 40.05 g Lauric acid in 100 mL MEK over 1 h. The second portion of 32.45 g Lauric acid was then mixed with the reaction mixture directly in the powder form. The reactor contents were allowed to stir for another 2 h at room temperature, followed with a filtration. The solution was collected, and the volatile components were removed under reduced pressure. The residual liquid was dried at 50° C. under reduced pressure for 1 h leaving behind the product as colorless liquid.

Example 1C: Acetyl Dioctyltin Methacrylate 40.75 g Dioctyltin oxide and 150 mL toluene were added to a 500 mL round bottom flask equipped with a thermocouple, condenser, $N_2$ inlet and paddle blade stirrer. The obtained suspension was heated to 50° C. under an $N_2$ blanket, and 9.71 g methacrylic acid in 10 mL toluene was added. The reaction mixture was continued to stir at 50° C. for 2 h until a homogeneous solution was obtained. The reaction mixture was then cooled to room temperature, followed with the addition of 7.1 g Acetic acid in 10 mL toluene. The reactor contents were allowed to stir for another 2 h at room temperature, followed with a filtration. The solution was collected, and the volatile components were removed under reduced pressure. The residual liquid was dried at 50° C. under reduced pressure for 1 h leaving behind the product as colorless liquid.

2. Synthesis of Organotin Polymers

Example 2A

A tin-containing polymer was prepared from the following ingredients:

| Ingredient | Wt. in g |
| --- | --- |
| Charge 1 | |
| Glycidyl methacrylate | 2.10 |
| Unicid ® 350 Acid | 6.60 |
| Solvesso ® 100 | 10.00 |
| Charge 2 | |
| Tin monomer of Ex. 1A | 11.50 |
| 2-Ethylhexyl acrylate | 5.44 |
| VAZO 67 | 1.68 |
| Solvesso ® 100 | 5.00 |
| Charge 3 | |
| Solvesso ® 100 | 5.02 |

VAZO ® 67 is a commercially available radical initiator (2,2'-Azobis(2-methylbutyronitrile). Unicid ® 350 Acid is a commercially available product containing linear primary carboxylic fatty acid. Solvesso ® 100 is commercially available mixture of organic solvents.

Charge 1 was added to a reactor equipped with a stirrer, thermocouple, condenser, and $N_2$ inlet. An $N_2$ blanket was applied and the reaction mixture was heated to 105° C. 2 drops of dimethylethanolamine was added to Charge 1, and the reactor contents were allowed to stir for 4 h at 105° C. The reaction mixture was then cooled to 100° C., and Charge 2 was added over 60 minutes. Charge 3 was added as rinse for Charge 2 upon completion. The reaction mixture was held at 100° C. for 120 minutes. The resulting material was a clear resin at the temperature above 60° C., but a wax-like solid at room temperature. The solid content (110° C., 1 h) is 60.07% and its viscosity is 233.2 cps at 60° C.

Example 2B

A tin-containing polymer was prepared from the following ingredients:

| Ingredient | Wt. in g |
| --- | --- |
| Charge 1 | |
| Glycidyl methacrylate | 1.88 |
| Unicid ® 350 Acid | 5.91 |
| Solvesso ® 100 | 10.00 |
| Charge 2 | |
| Tin monomer of Ex. 1B | 13.68 |
| 2-Ethylhexyl acrylate | 4.87 |
| VAZO ® 67 | 1.53 |
| Solvesso ® 100 | 5.00 |
| Charge 3 | |
| Solvesso ® 100 | 5.00 |

Charge 1 was added to a reactor equipped with a stirrer, thermocouple, condenser, and $N_2$ inlet. An $N_2$ blanket was applied and the reaction mixture was heated to 105° C. 2 drops of dimethylethanolamine was added, and the reactor contents were allowed to stir for 4 h at 105° C. The reaction mixture was then cooled to 100° C., and Charge 2 was added over 50 minutes. Charge 3 was added as rinse for Charge 2 upon completion. The reaction mixture was held at 100° C. for 120 minutes. The resulting material was a clear resin at the temperature above 60° C., but a wax-like solid at room temperature. The solid content (110° C., 1 h) is 60.59% and its viscosity is 67.5 cps at 60°.

Example 2C

A tin-containing polymer was prepared from the following ingredients:

| Ingredient | Wt. in g |
| --- | --- |
| Charge 1 | |
| Glycidyl methacrylate | 1.88 |
| Unicid ® 350 Acid | 5.91 |
| Solvesso ® 100 | 10.00 |
| Charge 2 | |
| Tin monomer of Ex. 1C | 12.94 |
| 2-Ethylhexyl acrylate | 4.87 |
| VAZO ® 67 | 1.50 |
| Solvesso ® 100 | 5.01 |
| Charge 3 | |
| Solvesso ® 100 | 4.96 |

Charge 1 was added to a reactor equipped with a stirrer, thermocouple, condenser, and $N_2$ inlet. An $N_2$ blanket was applied and the reaction mixture was heated to 105° C. 2 drops of dimethylethanolamine was added, and the reactor contents were allowed to stir for 4 h at 105° C. The reaction mixture was then cooled to 100° C., and Charge 2 was added over 60 minutes. Charge 3 was added as rinse for Charge 2 upon completion. The reaction mixture was held at 100° C. for 120 minutes. The resulting material was a clear resin at the temperature above 60° C., but a wax-like solid at room temperature. The solid content (110° C., 1 h) is 58.33% and its viscosity is 71.3 cps at 60° C.

3. Synthesis of a poly(meth)acrylate Polyol

Example 3: Preparation of a Poly(meth)acrylate Polyol

A reactor flushed with nitrogen and fitted with a condenser was charged with 157.90 parts by weight of amyl acetate, and this initial charge was heated to 142° C. with stirring. In parallel to this, two separate feeds were prepared. Feed 1 consisted of 307.78 parts by weight of 2-hydroxyethyl methacrylate, 98.86 parts by weight of 2-ethylhexyl methacrylate, 63.41 parts by weight of 2-ethylhexyl acrylate, 151.72 parts by weight of cyclohexyl methacrylate, and 7.77 parts by weight of Solvesso® 100. Feed 2 consisted of 68.0 parts by weight of tert-butyl peroxy acetate (50 w.% in odorless mineral spirits) and 7.77 parts by weight of Solvesso® 100. When the temperature had reached 142° C., feed 1 and 2 were metered in simultaneously and at a uniform rate over a time of 240 minutes. After the end of the metered addition, the reaction mixture was stirred for post polymerization at 142° C. for 45 minutes more. Feed 3 consisted of 6.39 parts by weight of tert-butyl peroxy acetate (50 wt. % in odorless mineral spirits) and 3.94 parts by weight of Solvesso® 100 was metered in at a uniform rate over a time of 30 minutes. After the end of the metered addition, the reaction mixture was stirred for post polymerization at 142° C. for 60 minutes more. The solids content of the resulting product was adjusted by 116.06 parts by weight of amyl acetate, and determined as being 67.0%, the OH number as 213.4 mg KOH/g (based on the solids), and the viscosity (at 23° C.) as 38 dPa S.

4. Preparation of Coating Compositions

Examples A, B and C: Preparation of coating compositions containing one polymer according to one of examples 2A, 2B or 2C as polymeric catalyst. The catalyst amount was adjusted to be the same tin equivalent amount.

The ingredients as listed in Table 1 were added to a mixing cup and mixed in order to obtain examples A to C. Desmodur® PL350 MPA/SN is a commercially available aliphatic blocked polyisocyanate. BYK® 325 is a commercially available modified polysiloxane for use as surface additive.

Comparative examples Comp1 and Comp2: Preparation of comparative coating compositions not containing any tin containing catalyst (Comp1) or containing a commercially available non-polymeric tin catalyst, namely the product Durastab® LT-2 DBTDL, which contains dibutyltin dilaurate as monomeric tin catalyst (Comp2).

The ingredients as listed in Table 1 were added to a mixing cup and mixed in order to obtain comparative examples Comp1 and Comp2.

TABLE 1

Inventive examples A, B and C and comparative exampes Comp1 and Comp2
Coating composition examples (mass in grams)

| Ingredient | Comp1 | Comp2 | A | B | C |
|---|---|---|---|---|---|
| Poly(meth)acrylate polyol of example 3 | 13.19 | 13.19 | 13.19 | 13.19 | 13.19 |

TABLE 1-continued

Inventive examples A, B and C and comparative exampes Comp1 and Comp2
Coating composition examples (mass in grams)

| Ingredient | Comp1 | Comp2 | A | B | C |
|---|---|---|---|---|---|
| Desmodur® PL350 MPA/SN | 10.98 | 10.98 | 10.98 | 10.98 | 10.98 |
| BYK® 325 | 0.05 | 0.05 | 0.05 | 0.05 | 0.05 |
| Durastab® LT-2 DBTDL | — | 0.17 | — | — | — |
| Example 2A | — | — | 0.39 | — | — |
| Example 2B | — | — | — | 0.45 | — |
| Example 2C | — | — | — | — | 0.45 |
| Solvesso® 100 | 8.95 | 8.95 | 8.95 | 8.95 | 8.95 |

5. Application and Performance

The viscosity of examples A, B and C as well as of Comp1 and Comp2 has been measured immediately after preparation (initial) and after 1 month stored at 24° C. or 40° C. In addition, with respect to the cure onset temperature E' and Tan Delta have been measure. All measurements have been performed according to the methods disclosed hereinbefore. The results are displayed in Table 2.

TABLE 2

Catalyst Performance Chart

| Examples/ Comparative examples | Initial viscosity (cps) | 1 month's viscosity (cps) at 24° C. | 1 month's viscosity (cps) at 40° C. | Cure Onset Temp (° C.) E' | Tan Delta |
|---|---|---|---|---|---|
| Comp1 | 150.0 | 223.7 | 309.9 | — | — |
| Comp2 | 100.5 | 540.3 | 1482 | 112.6 | 112.8 |
| Example A | 143.4 | 205.9 | — | 109.5 | 110.4 |
| Example B | 145.9 | 225.7 | 790 | 114.0 | 114.7 |
| Example C | 132.2 | 249.7 | 552 | 102.7 | 107.2 |

The invention claimed is:

1. A (meth)acrylic copolymer comprising a polymeric backbone and at least two kinds of side chains (S1) and (S2) attached to said polymeric backbone, which are different from each other, wherein
    one or more side chains (S1) comprise at least one tin-containing moiety and
    one or more side chains (S2) heaving bear at least one ester group of formula —O—C(=O)—R$^1$, wherein R$^1$ is a linear or branched, saturated or unsaturated, acyclic aliphatic residue having at least 18 carbon atoms.

2. The copolymer according to claim 1, characterized in that the relative molar ratio of at least one structural unit (SU1), which contains the one or more side chains (S1), to at least one structural unit (SU2), which contains the one or more side chains (S2), in the (meth)acrylic copolymer is in the range of from 15:1 to 1:2.5.

3. The copolymer according to claim 1, characterized in that the amount of structural units (SU1), which contain the one or more side chains (S1), is at least 20 mole-%, based on the total amount of all structural units of the copolymer, and in that the amount of structural units (SU2), which contains the one or more side chains (S2), is at least 10 mole-% based on the total amount of all structural units of the copolymer.

4. The copolymer according to claim 1, characterized in that the one or more side chains (S1) are represented by the part structure (PS1)

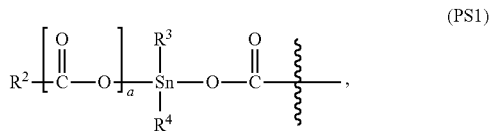

(PS1)

wherein the symbol —ξ— denotes a covalent bond of part structure (PS1) to the backbone of the copolymer, parameter a is 0 or 1 and $R^2$, $R^3$ and $R^4$ independently of one another represent a linear, saturated, alkyl group with 1 to 30 carbon atoms, a branched, saturated, alkyl group with 3 to 30 carbon atoms, an aryl group with 6 to 30 carbon atoms, or an alkylaryl group or arylalkyl group, in each case with 7 to 30 carbon atoms.

5. The copolymer according to claim 4, characterized in that parameter a is 1 and $R^2$, $R^3$ and $R^4$ independently of one another represent a linear, saturated, alkyl group with 1 to 20 carbon atoms or a branched, saturated, alkyl group with 3 to 20 carbon atoms.

6. The copolymer according to claim 1, characterized in that $R^1$ is a linear or branched, saturated or unsaturated, acyclic aliphatic residue having from 18 to 60 carbon atoms.

7. The copolymer according to claim 1, characterized in that the one or more side chains (S2) are represented by the part structure (PS2)

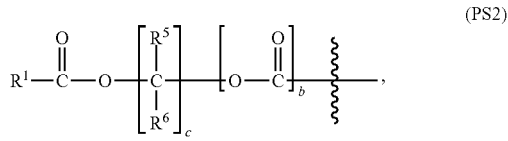

(PS2)

wherein the symbol —ξ— denotes a covalent bond of part structure (PS2) to the backbone of the copolymer, parameter b is 0 or 1, parameter c is in the range of from 2 to 20, $R^1$ is a linear or branched, saturated or unsaturated, acyclic aliphatic residue having at least 18 carbon atoms, each $R^5$ independently represents hydrogen, hydroxyl, a linear, saturated, alkyl group with 1 to 30 carbon atoms or a branched, saturated, alkyl group with 3 to 30 carbon atoms, and each $R^6$ independently represents hydrogen, a linear, saturated, alkyl group with 1 to 30 carbon atoms or a branched, saturated, alkyl group with 3 to 30 carbon atoms.

8. The copolymer according to claim 7, characterized in that parameter b is 1, parameter c is in the range of from 2 to 10, each $R^5$ independently represents hydrogen or hydroxyl, and each $R^6$ represents hydrogen.

9. The copolymer according to claim 1, characterized in that it has at least one further kind of side chains (S3) attached to its polymeric backbone, which are different from both side chains (S1) and (S2), wherein one or more side chains (S3) being are represented by the part structure (PS3)

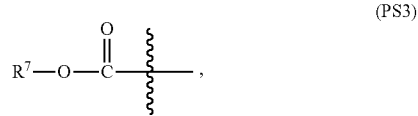

(PS3)

wherein $R^7$ denotes a linear, saturated, alkyl group with 1 to 30 carbon atoms, a branched, saturated, alkyl group with 3 to 30 carbon atoms, an aryl group with 6 to 30 carbon atoms, or an alkylaryl group or arylalkyl group, in each case with 7 to 30 carbon atoms.

10. The copolymer according to claim 9, characterized in that it contains structural units (SU1), (SU2) and (SU3), wherein (SU1) contains the at least one side chain (S1), (SU2) contains the at least one side chain (S2), and (SU3) contains at least one side chain (S3) and in that, based on the total quantity of structural units (SU1), (SU2) and (SU3), it contains the following proportions in mole-%

10 to 70 mole-% of the structural units (SU1)

10 to 40 mole-% of the structural units (SU2) and 5 to 60 mole-% of the structural units (SU3), wherein the total content of structural units (SU1) and (SU2) and (SU3) in the copolymer adds up 100 mole %.

11. A method of preparing the (meth)acrylic copolymer according to claim 1, the method comprising at least one step, wherein (s1) at least one (meth)acrylic monomer comprising at least one tin-containing moiety, and (s2) at least one (meth)acrylic monomer bearing at least one ester group of formula —O—C(=O)—$R^1$, wherein $R^1$ is a linear or branched, saturated or unsaturated, acyclic aliphatic residue having at least 18 carbon atoms, and optionally (s3) at least one ethylenically-unsaturated monomer, which is different from both monomers (s1) and (s2), are copolymerized to form the copolymer, or wherein (s1) at least one (meth)acrylic monomer comprising at least one tin-containing moiety, and (s2) at least one (meth)acrylic monomer bearing at least one functional group capable of being reacted with a carboxylic acid that provides an ester group of formula —O—C(=O)—$R^1$, wherein $R^1$ is a linear or branched, saturated or unsaturated, acyclic aliphatic residue having at least 18 carbon atoms, and optionally (s3) at least one ethylenically unsaturated monomer, which is different from both monomers (s1) and (s2), are copolymerized to form the copolymer followed by reacting the at least one functional group of the structural unit obtained from the at least one monomer (s2) with the carboxylic acid that provides an ester group of formula —O—C(=O)—$R^1$, wherein $R^1$ is a linear or branched, saturated or unsaturated, acyclic aliphatic residue having at least 18 carbon atoms, in a polymer analogous reaction.

12. A method of using the (meth)acrylic copolymer according to claim 1, the method comprising using the (meth)acrylic copolymer as a catalyst in crosslinking reactions, in coating compositions and/or for lengthening the pot life of coating compositions and/or for lowering the curing temperatures of coating compositions.

13. A coating composition comprising at least one polymer as binder component (a) and at least one (meth)acrylic copolymer according claim 1 as component (b), wherein the polymer of the binder component (a) is different from the (meth)acrylic copolymer of component (b).

14. The coating composition according to claim 13, characterized in that it contains the at least one (meth)acrylic copolymer as component (b) in an amount of from 0.1 to 5 wt.-%, based on the total weight of the coating composition.

15. A method of coating a substrate comprising at least one step (1), wherein step (1) comprises applying a coating composition according to claim 13 to a substrate.

* * * * *